(12) United States Patent
Kanaya

(10) Patent No.: US 8,714,530 B2
(45) Date of Patent: May 6, 2014

(54) FLUID-FILLED VIBRATION-DAMPING DEVICE

(75) Inventor: Tomohiro Kanaya, Kasugai (JP)

(73) Assignee: Tokai Rubber Industries, Ltd., Aichi (JP)

( * ) Notice: Subject to any disclaimer, the term of this patent is extended or adjusted under 35 U.S.C. 154(b) by 178 days.

(21) Appl. No.: 13/534,432

(22) Filed: Jun. 27, 2012

(65) Prior Publication Data
US 2013/0001842 A1 Jan. 3, 2013

(30) Foreign Application Priority Data
Jun. 30, 2011 (JP) ................................ 2011-145053

(51) Int. Cl.
*F16F 5/00* (2006.01)

(52) U.S. Cl.
USPC .................................. 267/140.13; 267/140.11

(58) Field of Classification Search
USPC ........................................ 267/140.11–140.15
See application file for complete search history.

(56) References Cited

U.S. PATENT DOCUMENTS

| | | | |
|---|---|---|---|
| 4,671,227 A * | 6/1987 | Hollerweger et al. | ... 267/140.13 |
| 5,769,402 A * | 6/1998 | Ide et al. | ............ 267/140.14 |
| 6,422,545 B1 * | 7/2002 | Baudendistel et al. | .. 267/140.13 |
| 6,435,487 B1 | 8/2002 | Takaoka et al. | |
| 6,540,215 B2 | 4/2003 | Takaoka et al. | |
| 6,863,269 B2 | 3/2005 | Okumura et al. | |
| 7,188,830 B2 | 3/2007 | Kato et al. | |
| 2004/0188904 A1* | 9/2004 | Ichikawa et al. | ......... 267/140.14 |
| 2011/0042870 A1* | 2/2011 | Kojima | .................... 267/140.11 |
| 2012/0074629 A1* | 3/2012 | Yamamoto et al. | ...... 267/140.13 |

OTHER PUBLICATIONS

U.S. Appl. No. 13/534,450 to Tomohiro Kanaya, filed Jun. 27, 2012.

* cited by examiner

*Primary Examiner* — Melanie Torres Williams

(74) *Attorney, Agent, or Firm* — Greenblum & Bernstein P.L.C.

(57) ABSTRACT

A fluid-filled vibration damping device including: a partition member having first and second partition plates overlapping, and a holding area formed between overlapping surfaces of center parts of the two partition plates; and a movable membrane held and arranged in the holding area. A claw-shaped part and a perforation window are formed at respective corresponding positions of outer circumference parts of the two partition plates, and a fixing mechanism is constituted with the claw-shaped part latched in a circumference edge part of the perforation window. A widening area is provided between an outer circumference surface of the movable membrane and an inner circumference surface of the holding area by partially making a large distance therebetween. At least one of the two partition plates has a first air vent hole piercing a part constituting a wall part of the widening area.

7 Claims, 8 Drawing Sheets

FLUID-FILLED VIBRATION-DAMPING DEVICE

INCORPORATED BY REFERENCE

The disclosure of Japanese Patent Application No. 2011-145053 filed on Jun. 30, 2011 including the specification, drawings and abstract is incorporated herein by reference in its entirety.

BACKGROUND OF THE INVENTION

1. Field of the Invention

The present invention relates to a vibration damping device used as an automobile engine mount or the like, for example, and particularly relates to a fluid-filled vibration damping device having a fluid chamber in which non-compressible fluid is enclosed in the interior.

2. Description of the Related Art

Vibration damping devices have been known which are interposed between members constituting a vibration transmission system for connecting these members, or alternatively for supporting one member on the other, in a vibration damping fashion. This vibration damping device includes: a first mounting member attached to one member of the vibration transmission system; a second mounting member attached to the other member of the vibration transmission system; and a main rubber elastic body elastically connecting the first and second mounting members. Furthermore, as one type of vibration damping device, a fluid-filled vibration damping device having a plurality of fluid chambers which have non-compressible fluid enclosed in the interior is known. In the fluid-filled vibration damping device, a fluid chamber filled with a non-compressible fluid is divided by a partition member into a first fluid chamber and a second fluid chamber. Furthermore, the partition member is provided with a holding area in which a movable membrane is installed with an outer circumference part grasped by the partition member. On both surfaces of the movable membrane, pressures of the first fluid chamber and the second fluid chamber are applied through communication holes formed on the partition member. Thus, minute deformation or minute displacement of the movable membrane is caused based on the relative pressure difference between the first fluid chamber and the second fluid chamber, thereby exhibiting a target vibration damping effect. U.S. Pat. No. 7,188,830 discloses an example of active type of fluid-filled vibration damping device, wherein an excitation force of an actuator applied to an excitation fluid chamber is transmitted to the pressure receiving chamber by the minute displacement of the movable membrane, exhibiting an active vibration damping effect.

With the fluid-filled vibration damping device as disclosed in U.S. Pat. No. 7,188,830, the partition member is constituted by a plate form first partition plate and second partition plate overlapping in the thickness direction, so that the holding area is formed between that first partition plate and second partition plate, and the movable membrane is housed within the holding area.

Meanwhile, when the work of combining the first partition plate and the second partition plate (partition forming work) is performed in air, there is the risk that air will remain between the first partition plate and the second partition plate. Therefore, it is necessary to perform this work inside a water tank filled with the non-compressible fluid, making the partition member forming work difficult. In particular, when the movable membrane is grasped at its outer circumference part between the first partition plate and the second partition plate, it is easy for air to remain. This requires doing attachment work within a non-compressible fluid. Furthermore, once the partition member is taken from the water tank into air, air penetrates again. Thus, the work of attaching the partition member to an integrally vulcanized product of the main rubber elastic body must be performed simultaneously without taking the partition member out from the water tank. As a result, complex work is required within fluid.

Additionally, at the stage before the combining work within fluid, the partition member is divided into at least three parts of the first partition plate, the second partition plate, and the movable membrane. Therefore, there was the problem that parts management and transport were troublesome.

SUMMARY OF THE INVENTION

It is therefore one object of this invention to provide a fluid-filled vibration damping device of a novel constitution for which it is possible to do assembly of a partition member equipped with a movable membrane in a holding area in air in advance before the work of attaching the partition member to a vibration damping device main unit, and also possible to easily eliminate air within the holding area when enclosing the non-compressible fluid.

A first mode of the present invention is a fluid-filled vibration damping device, which comprises: a first mounting member; a second mounting member; a main rubber elastic body elastically connecting the first and second mounting member; a fluid chamber filled with a non-compressible fluid; a partition member supported by the second mounting member, dividing the fluid chamber into a first fluid chamber and a second fluid chamber, and having a holding area; a movable membrane held and arranged in the holding area of the partition member with an outer circumference part thereof being grasped by the partition member in a thickness direction; and communicating holes being formed with the partition member so that pressures of the first fluid chamber and the second fluid chamber are applied to opposite surfaces of the movable membrane through the communicating holes so that the movable membrane undergoes elastic deformation based on pressure difference between the first fluid chamber and the second fluid chamber, wherein the partition member comprises a first partition plate and a second partition plate overlapping, and the holding area is formed between overlapping surfaces of center parts of the first partition plate and the second partition plate, at least one claw-shaped part and at least one perforation window are formed at respective corresponding positions of an outer circumference part of the first partition plate and an outer circumference part of the second partition plate, and a fixing mechanism is constituted with the claw-shaped part latched in a circumference edge part of the perforation window to fix the first partition plate and the second partition plate, a widening area is provided between an outer circumference surface of the movable membrane and an inner circumference surface of the holding area, by making a distance between facing surfaces large partially at a circumference, and at least one of the first partition plate and the second partition plate has at least one first air vent hole that is pierced at a part constituting a wall part of the widening area.

With the fluid-filled vibration damping device having a constitution according to the first mode, since the partition member is formed with the first partition plate and the second partition plate overlapping, it is easy to form a holding area between the overlapping surfaces of the first partition plate and the second partition plate.

In fact, the first partition plate and the second partition plate are mutually fixed at the outer circumference part by a fixing mechanism, so it is possible to form and prepare in advance a partition member equipped with a movable membrane, before the assembly work within non-compressible fluid. As a result, with the assembly work of the fluid-filled vibration damping device which is performed in a water tank filled with non-compressible fluid, it is possible to reduce the number of parts and simplify the work, making it possible to improve manufacturing efficiency. Additionally, by assembling in advance in air the first partition plate, the second partition plate, and the movable membrane, the effect of making parts management and transport easier can also be anticipated.

Also, in the gap between the movable membrane outer circumference surface and the holding area inner circumference surface is provided a widening area which is made partially bigger at the circumference, and that widening area is connected to the outside through first air vent hole. When attaching the partition member to the second mounting member within a water tank filled with non-compressible fluid or the like, the air, which has entered between the movable membrane, the first partition plate, and the second partition plate when the partition member is formed in air, is prevented from being adhesive to the partition member owing to the widening area, whereby the air is easily discharged to the outside through the first air vent hole. This makes it possible to prevent unnecessary air from remaining within the fluid chamber, and to avoid adverse effects on vibration damping performance due to air compressibility.

Furthermore, when actively eliminating air that remains in the partition member using water current or the like, the water current enters the widening area through the first air vent hole, so the water current easily penetrates to the depth of the gap provided between the movable membrane outer circumference surface and the holding area inner circumference surface. As a result, not only the air remaining within the widening area, but also the air of the part off the widening area in the gap can be effectively eliminated by pushing out using water current.

The second mode of the present invention is the fluid-filled vibration damping device according to the first mode wherein both the center part of the first partition plate and the center part of the second partition plate project to one side in the thickness direction, the center part of the first partition plate has a wider diameter than the center part of the second partition plate, the center part of the second partition plate is inserted in the center part of the first partition plate, a ring-shaped area is formed in a radial direction between the center part of the first partition plate and the center part of the second partition plate, and at least one second air vent hole is pierced in a wall part of the ring-shaped area.

With the second mode, since the ring-shaped area is formed between the overlapping surfaces of the first partition plate and the second partition plate, the air held between the first partition plate and the second partition plate when forming the partition member in air is easily discharged to the outside through the second air vent hole because of a reduction in the adhesion force to the partition member based on the interfacial tension or the like at the ring-shaped area. As a result, air is prevented from remaining between the first partition plate and the second partition plate, and fixing of the first partition plate and the second partition plate in air is realized while preventing adverse effects on vibration damping performance.

The third mode of the present invention is the fluid-filled vibration damping device according to the second mode, wherein the at least one second air vent hole comprises a plurality of second air vent holes, and the second air vent holes are respectively formed on the first partition plate and the second partition plate, while at least one of the second air vent holes is closed in a state with the partition member supported by the second mounting member.

With the third mode, the air inside the ring-shaped area is discharged to the outside through the second air vent hole formed on the first partition plate and the second air vent hole formed on the second partition plate, so air is more effectively prevented from remaining in the ring-shaped area. In particular, when actively eliminating air using water current, the water current that enters from either one of the second air vent hole of the first partition plate and the second air vent hole of the second partition plate is output to the outside from the other second air vent hole to effectively exhaust the air within the ring-shaped area.

In addition, by the partition member being attached to the second mounting member, at least one of the second air vent hole is closed or blocked, so in a state mounted on the second mounting member of the partition member, there is no occurrence of fluid flow through the second air vent holes and the ring-shaped area between the first fluid chamber and the second fluid chamber. Because of that, even when the second air vent holes and the ring-shaped area are provided piercing the partition member, it is possible to avoid an adverse effect on vibration damping performance due to escaped fluid pressure or the like through the second air vent holes and the ring-shaped area.

The fourth mode of the present invention is the fluid-filled vibration damping device according to any of the first through third modes, wherein the inner circumference surface of the holding area is formed in a circular shape, while the outer circumference surface of the movable membrane is formed in a polygonal shape, and the widening area is formed between peripheral faces at sides of the movable membrane and the inner circumference surface of the holding area, while a narrowing area of a narrower width than the widening area is formed between peripheral faces at corners of the movable membrane and the inner circumference of the holding area.

With the fourth mode, using the fact that there is a large separation of the peripheral faces at sides of the polygonal shaped movable membrane from the inner circumference surface of the circular shaped holding area, the widening area is formed across a broad range around the circumference. Because of that, the air that enters between the outer circumference surface of the movable membrane and the inner circumference surface of the holding area is effectively eliminated to the outside in a broader range around the circumference.

Also, the peripheral faces at corners of the movable membrane and the inner circumference surface of the holding area are in close proximity at the narrow distance between facing surfaces, and the movable membrane is made to be positioned approximately within the holding area. Because of that, it is possible to easily install the movable membrane at a specified position in the holding area, and it becomes possible to make the target vibration damping properties stable.

Furthermore, the narrowing area is formed using the corners of the polygonal shaped movable membrane, and is provided with a narrow range in the circumference direction, so the air that has entered the narrowing area easily moves to the widening area, and is easily discharged to the outside through the first air vent hole. Additionally, since the widening area and the narrowing area are mutually connected in the circumference direction, when performing active elimination work of the air using water current, using the fluid pressure of the water current flowed into the widening area from the first air vent holes, the air within the narrowing area is moved to the other adjacent widening area by the water current, and is discharged to the outside from the first air vent holes that open to the wall part of that widening area. In this way, it is possible to do elimination easily by pushing the air of the narrowing area to the adjacent widening area in the circumference direction by the water current.

The fifth mode of the present invention is the fluid-filled vibration damping device according to any of the first through fourth modes, wherein a through hole is formed piercing the movable membrane in the thickness direction.

With the fifth mode, the air that has entered inside the holding area further to the inner circumference side than the grasping part of the movable membrane partition member is effectively discharged to the outside by having the non-compressible fluid flowed through the through holes of the movable membrane. In particular, when water current is blown from outside to push the air out, the water current through the through holes also acts on the side facing opposite the thickness direction of the movable membrane, so air elimination is realized efficiently.

The sixth mode of the present invention is the fluid-filled vibration damping device according to any of the first through fifth modes, wherein the at least one claw-shaped part comprises a plurality of the claw-shaped parts while the at least one perforation window comprises a plurality of the perforation windows, and the fixing mechanism is constituted by at least one of the claw-shaped parts being latched with the circumference edge part of the corresponding perforation window, and also, a positioning mechanism is constituted which positions the partition member within the fluid chamber in a direction orthogonal to an overlapping direction of the first partition plate and the second partition plate, by contacting at least one of the claw-shaped parts with an inner circumference surface of the fluid chamber.

With the sixth mode, the fixing mechanism is constituted by a portion of the plurality of claw-shaped parts being latched with the circumference edge part of the perforation window, and also, the positioning mechanism is constituted by the other claw-shaped parts projecting in the overlapping direction of the first partition plate and the second partition plate and overlapping on the inner circumference surface of the fluid chamber. Therefore, with the fixing mechanism, it is possible to form the partition member in advance by fixing the first partition plate and the second partition plate before the assembly process of the fluid-filled vibration damping device, and also, it is possible to easily position the partition member in relation to the second mounting member when attaching the partition member to the second mounting member using the positioning mechanism, and thus to attach at a specified position.

The seventh mode of the present invention is the fluid-filled vibration device according to any of the first through sixth modes, wherein the first fluid chamber is a pressure receiving fluid chamber whose wall is partially defined by the main rubber elastic body, while the second fluid chamber is an excitation fluid chamber whose wall is partially defined by an excitation member, and also, an actuator is provided which applies excitation force to the excitation member and applies active pressure fluctuation to the excitation fluid chamber, while being supported by the second mounting member.

With the seventh mode, for an active type fluid-filled vibration damping device requiring high level vibration damping performance, the manufacture thereof is made easier by the first partition plate and the second partition plate and the movable membrane being combined in advance in air to form the partition member. Also, by preventing air from mixing into the fluid chamber, it is possible to effectively achieve the target high level vibration damping performance.

With the present invention, the partition member is constituted by overlapping the first partition plate and the second partition plate, and the fixing mechanism for fixing the first partition plate and the second partition plate is constituted by latching the claw-shaped part with the circumference edge part of the perforation window. Because of that, by fixing the first partition plate and the second partition plate in air before doing the attachment work of the partition member on the second mounting member which is performed in non-compressible fluid, the work within the non-compressible fluid is simplified, making manufacturing easier. In addition, compared to when doing individual management of the first partition part, the second partition part, and the movable part respectively, parts management and transport is easier. Furthermore, a widening area with the distance between the facing surfaces made partially bigger on the circumference is provided between the outer circumference surface of the movable membrane and the inner circumference surface of the holding area, and also, one of the first partition plate and the second partition plate constituting the partition member has first air vent holes pierced and formed in the part constituting the wall part of the widening area. As a result, when assembling the partition member in air, the air that has entered between the outer circumference surface of the movable membrane and the inner circumference surface of the holding area is easily discharged to the outside through the widening area and the first air vent holes, and air is prevented from remaining in the fluid chamber.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
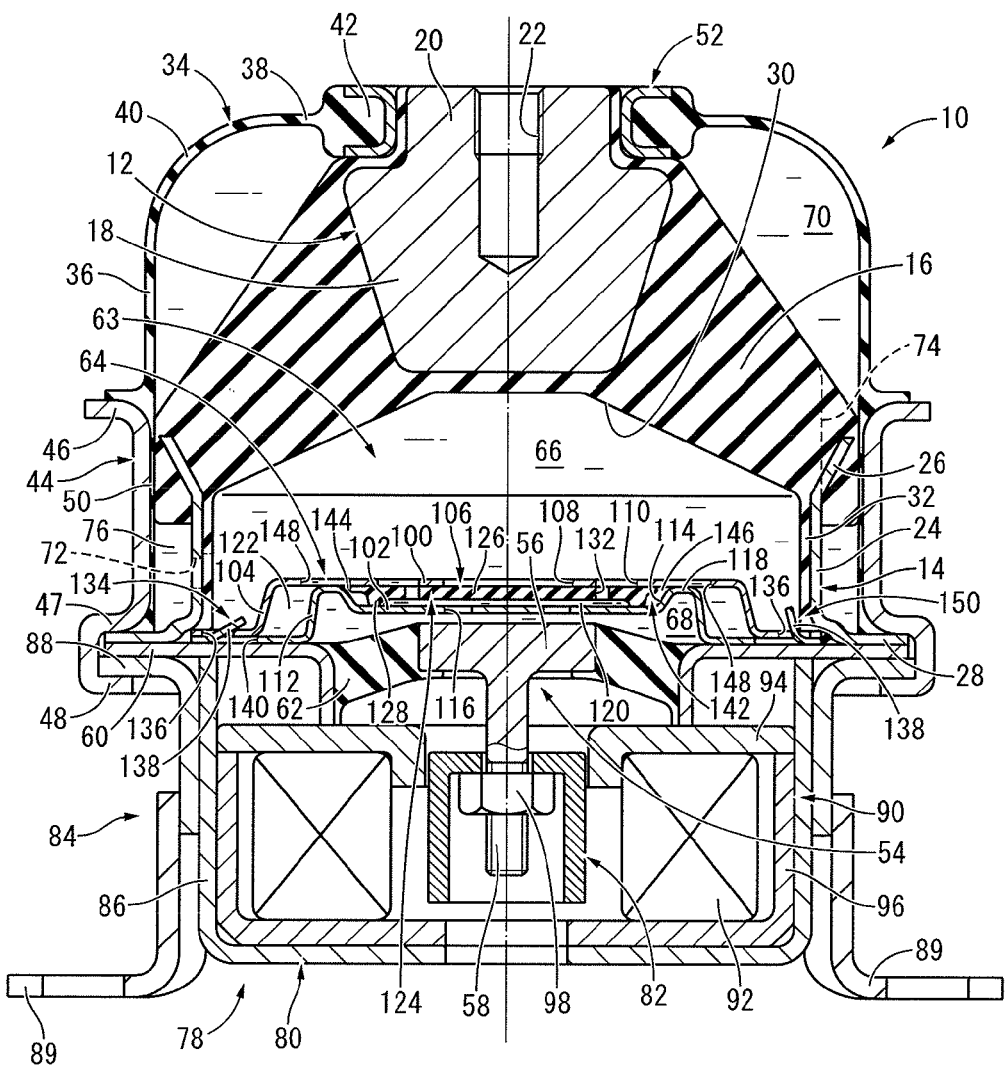
FIG. 1 is a vertical cross sectional view showing a fluid-filled vibration damping device in the form of an engine mount as a first embodiment of the present invention.

FIG. 1 shows an automobile engine mount 10 as the first embodiment of the fluid-filled vibration damping device constituted according to the present invention. The engine mount 10 has a constitution for which a first mounting member 12 and a second mounting member 14 are elastically connected by a main rubber elastic body 16, and the first mounting member 12 is attached to a power unit (not shown), and the second mounting member 14 attached to a vehicle body (not shown). With the description below, the up-down direction means the up-down direction in FIG. 1 as a rule.

More specifically, the first mounting member 12 exhibits overall a small diameter, roughly stepped round column shape, and is equipped with a lower fixing part 18 having a reverse direction, roughly truncated cone shape and a round column shaped upper engaging part 20 projecting facing upward with a smaller diameter than the top end part of the lower fixing part 18 as an integrated unit. Furthermore, a bolt hole 22 that extends over the central axis and opens at the top surface is formed on the first mounting member 12, and a screw thread is formed on the inner circumference surface.

The second mounting member 14 has a thin-walled, large diameter ring shape, having an upper end taper part 26 extending out with a gradually expanding diameter facing upward in the axial direction from the top end of a center tube shaped part 24 which has a roughly round cylinder shape, and has a lower end crimping part 28 extending facing outward in the axial perpendicular direction from the lower end.

Then, the first mounting member 12 is arranged on the same center axis above the second mounting member 14, and the first mounting member 12 and the second mounting member 14 are elastically connected by the main rubber elastic body 16. The main rubber elastic body 16 exhibits a thick-walled, large diameter, roughly circular truncated cone shape, and the lower fixing part 18 of the first mounting member 12 is adhered by vulcanization to the small diameter side end part, and also, the upper end taper part 26 of the second mounting member 14 is adhered by vulcanization to the large diameter side end part. The main rubber elastic body 16 is formed as an integral vulcanized molded article equipped with the first mounting member 12 and the second mounting member 14. Also, a rubber layer formed as an integral unit with the main rubber elastic body 16 is adhered by vulcanization on the lower fixing part 18 upper surface and the upper engaging part 20 outer circumference surface of the first mounting member 12.

Furthermore, a large diameter recess 30 is formed on the main rubber elastic body 16. The large diameter recess 30 is a recess that opens toward the large diameter side end surface of the main rubber elastic body 16, and exhibits an opposite facing, roughly mortar shape that is smaller than the inner diameter of the second mounting member 14.

Furthermore, a sealing rubber layer 32 extends downward from the opening circumference edge part of the large diameter recess 30 at the main rubber elastic body 16. The sealing rubber layer 32 is a rubber elastic body exhibiting a thin-walled, large diameter round cylinder shape, and is formed so as to cover the inner circumference surface of the second mounting member 14.

Also, a flexible film 34 is attached to the second mounting member 14. The flexible film 34 forms a ring shape overall, and an outer circumference end cylinder part 36 and an inner circumference end annular disk part 38 are constituted connected by an arc-shaped curved part 40. Furthermore, a ring-shaped fixing part 42 is integrally formed further to the inner circumference side than the annular disk part 38 of the flexible film 34.

Furthermore, an outer circumference fixing member 44 is adhered by vulcanization to the outer circumference end part of the flexible film 34. The outer circumference fixing member 44 exhibits an overall roughly round cylinder shape, and has a flange part 46 provided on the top end part, and also, a cylinder shaped crimping piece 48 is integrally formed via a step part 47 on the bottom end part. Then, the outer circumference end part of the flexible film 34 is adhered by vulcanization to the top end part of the outer circumference fixing member 44 which contains the flange part 46. A covering rubber layer 50 which is integrally formed with the flexible film 34 is formed adhered along roughly the entirety except for the crimping piece 48 on the inner circumference surface of the outer circumference fixing member 44.

Furthermore, an inner circumference fixing member 52 is adhered by vulcanization to the fixing part 42 constituting the inner circumference end part of the flexible film 34. The inner circumference fixing member 52 has an annular ring shape, and has a shape for which the respective end part flanges extend toward the outer circumference side from both ends of the center part which is a round cylinder extending in the axial direction. Then, by having the fixing part 42 adhered by vulcanization to the outer circumference surface of the inner circumference fixing member 52, the flexible film 34 is adhered by vulcanization to the inner circumference fixing member 52. The flexible film 34 is formed as an integral vulcanized molded article equipped with the outer circumference fixing member 44 and the inner circumference fixing member 52.

The flexible film 34 with this kind of constitution has the outer circumference part supported by the second mounting member 14 by the crimping piece 48 of the outer circumference fixing member 44 having the lower end part bent to the inner circumference side, and being fixed by crimping to the lower end crimping part 28 of the second mounting member 14. Furthermore, the flexible film 34 has the inner circumference part attached to the first mounting member 12 by the inner circumference fixing member 52 being fit externally to the upper engaging part 20 of the first mounting member 12.

The center tube shaped part 24 and the upper end taper part 26 of the second mounting member 14 are separated to the inner circumference side along the entire circumference in relation to the outer circumference fixing member 44, and also, the part fixed to the outer circumference surface of the center tube shaped part 24 top end part and upper end taper part 26 of the main rubber elastic body 16 is stuck to the outer circumference fixing member 44 via the covering rubber layer 50. As a result, a ring shaped space is formed between the center tube shaped part 24 and the upper end taper part 26 of the second mounting member 14 on the one hand, and the outer circumference fixing member 44 on the other.

Also, an excitation member 54 is installed on the lower side opening part of the second mounting member 14. The excitation member 54 is equipped as an integral unit with a roughly disk shaped excitation plate part 56 and a connecting rod part 58 extending facing downward at the center axis of the excitation plate part 56.

Also, the excitation member 54 is elastically supported by the second mounting member 14. Specifically, a roughly annular ring shape or circular disk shaped support member 60 is installed separated by a specified distance at the outer circumference side of the excitation member 54, and this support member 60 is fixed to the second mounting member 14 by the crimping piece 48 of the outer circumference fixing member 44. Also, as a spring means, a support rubber elastic body 62 is installed in the radial direction between the support member 60 and the excitation plate part 56. The support rubber elastic body 62 has a roughly annular disk shape tilting down toward the outer circumference side, and the inner circumference surface is adhered by vulcanization to the outer circumference surface of the excitation plate part 56, and also, the outer circumference surface is adhered by vulcanization to the inner circumference surface of the outer circumference fixing member 44. As a result, the excitation plate part 56 of the excitation member 54 and the support member 60 are mutually elastically connected by the support rubber elastic body 62, and the excitation member 54 is elastically supported by the second mounting member 14.

In this way, by the excitation member 54 being supported by the second mounting member 14, the lower side opening part of the second mounting member 14 is blocked with a fluid proof seal. Then, a fluid chamber 63 which is sealed from the outside is formed between the surfaces facing opposite the axial direction of the main rubber elastic body 16 and the excitation member 54, and an non-compressible fluid is enclosed in this fluid chamber 63. This non-compressible fluid is not particularly limited, but for example water, alkylene glycol, polyalkylene glycol, silicone oil, or mixed solutions of these or the like can be suitably used. Furthermore, to advantageously obtain the vibration damping effect based on the fluid flow action described later, it is preferable to use as the enclosed fluid a fluid of a low viscosity of 0.1 Pa·s or lower.

Also, a partition member 64 is installed above the excitation member 54. The partition member 64 overall exhibits a roughly stepped round disk shape for which the center part projects upward, its outer circumference part overlaps the top surface of the support member 60, and is supported by the second mounting member 14, and also, the center part is installed separated by a specified distance above the excitation member 54 and the support rubber elastic body 62.

Then, by the partition member 64 being installed so that it expands in the axis perpendicular direction within the fluid chamber 63, the fluid chamber 63 is divided by the partition member 64, and is divided into two vertically. Specifically, a pressure receiving fluid chamber 66 is formed on the top side sandwiching the partition member 64 as the first fluid chamber for which a portion of the wall part is constituted by the main rubber elastic body 16, and the internal pressure fluctuation is elicited during vibration input, and also, an excitation fluid chamber 68 is formed on the bottom side sandwiching the partition member 64 as the second fluid chamber for which a portion of the wall part is constituted by the excitation member 54. In other words, the excitation fluid chamber 68 is provided on the opposite side in relation to the pressure receiving fluid chamber 66 sandwiching the partition member 64.

Then, an equilibrium fluid chamber 70 which allows capacity changes is formed on the opposite side to the pressure receiving fluid chamber 66 (outer circumference side of the main rubber elastic body 16) sandwiching the main rubber elastic body 16 with a portion of the wall part constituted by the flexible film 34. The same kind of non-compressible fluid as that of the pressure receiving fluid chamber 66 and the excitation fluid chamber 68 is enclosed in the equilibrium fluid chamber 70.

Also, the ring shaped space formed between the second mounting member 14 and the outer circumference fixing member 44 communicates with the pressure receiving fluid chamber 66 through a first connection hole 72 pierced in the radial direction of the center tube shaped part 24 of the second mounting member 14 and the sealing rubber layer 32, and also, communicates with the equilibrium fluid chamber 70 through a second connection hole 74 piercing the upper end taper part 26 of the second mounting member 14 and the main rubber elastic body 16. As a result, an orifice path 76 is formed by which the pressure receiving fluid chamber 66 and the equilibrium fluid chamber 70 mutually communicate. This orifice path 76, by adjusting the ratio of the path cross section area (A) and the path length (L) taking into consideration wall spring rigidity, has the tuning frequency set to approximately 10 Hz which correlates to engine shake. The ring shaped space formed between the second mounting member 14 and the outer circumference fixing member 44 is sectioned to a length slightly shorter than one circumference by a partition (not shown) formed as an integral unit with the main rubber elastic body 16 being provided on part of the circumference.

Meanwhile, an actuator 78 is installed below the excitation member 54. The actuator 78 is a so-called electromagnetic actuator equipped with a stator 80 supported by the second mounting member 14, and a mover 82 which is allowed relative displacement in the axial direction in relation to the stator 80.

The stator 80 is equipped with a housing 84 fixed by crimping to the second mounting member 14 by the crimping piece 48 of the outer circumference fixing member 44. The housing 84 is equipped with a housing main unit 86 of a roughly round cylinder shape with a bottom for which a round through hole is formed at the center of the bottom wall part, and a flange type attachment part 88 exhibiting a hook shaped cross section. Furthermore, a plurality of leg parts 89 are fixed to the outside of the attachment part 88. The through hole formed at the center of the bottom wall part of the housing main unit 86 can also be blocked with the object of preventing infiltration by foreign matter or the like.

A coil member 90 is also attached to the housing 84. The coil member 90 is formed by an upper yoke 94 being overlapped on the top surface and the inner circumference surface top part of a coil 92 exhibiting a round cylinder shape, as well as by a lower yoke 96 being overlapped on the outer circumference surface and lower surface of the coil 92. The upper yoke 94 and the lower yoke 96 are both formed using ferromagnetic materials, and a magnetic path is made to be formed when energy is conducted to the coil 92. Also, the inner circumference end part of the upper yoke 94 and the inner circumference end part of the lower yoke 96 are separated vertically, and when energy is conducted to the coil 92, a magnetic gap occurs between the inner circumference end parts of the upper and lower yokes 94 and 96, and mutually different magnetic poles are made to be formed at the inner circumference end part of the upper yoke 94 and the inner circumference end part of the lower yoke 96. Then, the coil member 90 is fixed to the housing 84 by the upper yoke 94 being engaged with the peripheral wall part of the housing main unit 86, and the lower yoke 96 being fit overlapping with the housing main unit 86 peripheral wall part and lower wall part.

Also, the mover 82 is inserted in the center hole of the coil member 90. The mover 82 is formed with a ferromagnetic body exhibiting a reverse direction, roughly round cylinder shape with a bottom, and a circular through hole is formed in the center part of the upper bottom wall part. This mover 82 has its upper end positioned higher than the inner circumference end part lower surface of the upper yoke 94, and the lower end is positioned higher than the upper surface of the inner circumference end part of the lower yoke 96.

Then, by electricity being supplied to the coil 92 from an external power supply (not shown), magnetic poles are respectively formed at the inner circumference end parts of the upper and lower yokes 94 and 96, and the mover 82 is pulled downward by magnetic force.

The actuator 78 constituted in this way is supported by the second mounting member 14. Specifically, by the attachment part 88 of the housing 84 being fixed by crimping by the crimping piece 48 of the outer circumference fixing member 44, the stator 80 is attached to the second mounting member 14.

Meanwhile, the mover 82 of the actuator 78 is attached to the excitation member 54. Specifically, the connecting rod part 58 of the excitation member 54 is inserted through the mover 82, and by having the upper bottom wall part of the mover 82 engaged in the axial direction in relation to a nut 98 screwed into the lower edge part of the connecting rod part 58, the mover 82 is retained by and attached to the connecting rod part 58 of the excitation member 54. For example, as noted in U.S. Pat. No. 7,188,830, it is also possible to have an energization means such as a coil spring or the like installed between the facing surfaces in the axial direction of the excitation plate part 56 and the mover 82, and by the mover 82 being energized downward in relation to the excitation member 54, to have the mover 82 pressed against the nut 98, to prevent loosening of the nut 98.

Then, with the actuator 78, when the mover 82 is pulled downward and displaced in the axial direction in relation to the stator 80 by electricity being supplied to the coil 92, the excitation member 54 is displaced downward together with the mover 82 by the latching of the mover 82 and the nut 98. After that, when supplying of electricity to the coil 92 is stopped, since the magnetic pulling force acting on the mover 82 is cancelled, by the restoring force based on the elasticity of the support rubber elastic body 62, the excitation member 54 returns to its initial position. By repeating the action noted above at specified cycles, the excitation member 54 undergoes vertical excitation displacement at the target frequency, and a specified pressure fluctuation is applied to the excitation fluid chamber 68. At the time the excitation member 54 returns to its initial position, the mover 82 also returns to the initial position together with the excitation member 54.

Also, the pressure receiving fluid chamber 66 and the excitation fluid chamber 68 are essentially communicating through the fluid flow path provided on the partition member 64, and the excitation force applied to the excitation fluid chamber 68 is transmitted to the pressure receiving fluid chamber 66.

Figure 2:
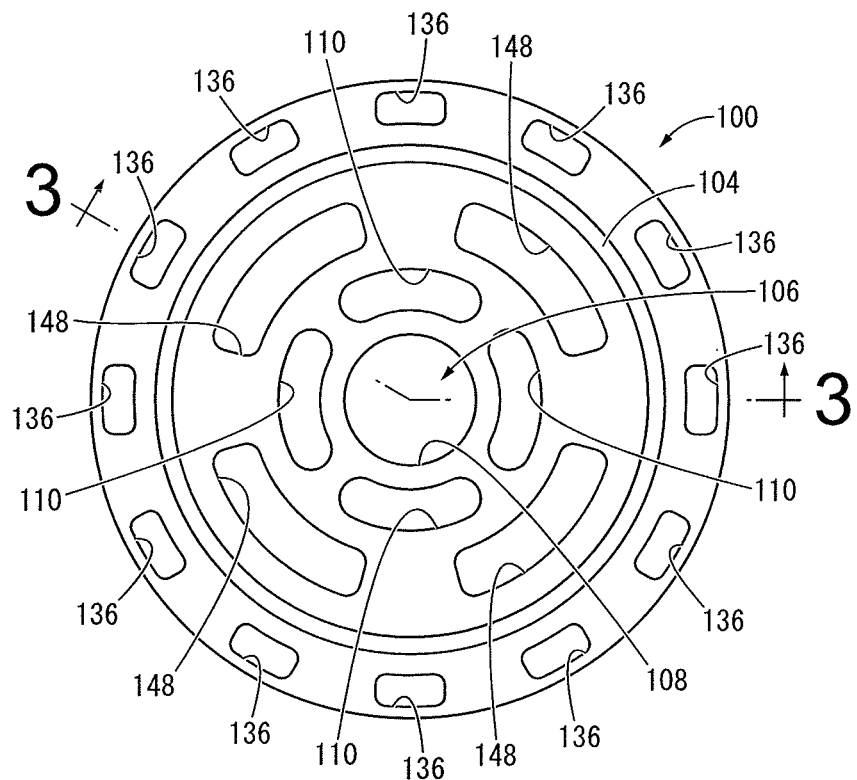
FIG. 2 is a plan view of a first partition plate constituting the engine mount shown in FIG. 1.
Figure 3:
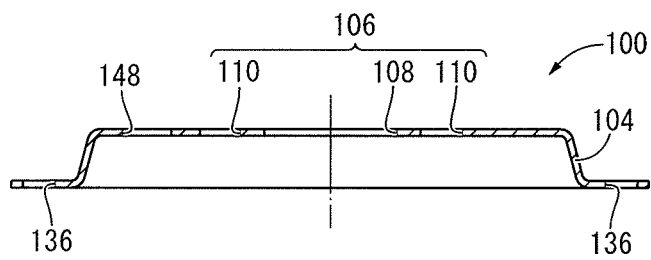
FIG. 3 is a cross sectional view taken along line 3-3 in FIG. 2.

In more detail, the partition member 64 is constituted including a first partition plate 100 and a second partition plate 102. As shown in FIG. 2 and FIG. 3, the first partition plate 100 has a roughly stepped, round disk shape, and exhibits a hat shape for which the center side is positioned further upward in relation to the outer circumference side than a ring shaped outer circumference step part 104 provided at the radial direction center part. Furthermore, an upper communicating hole 106 is formed as a communicating hole further to the center than the outer circumference step part 104 of the first partition plate 100. This upper communicating hole 106 pierces the first partition plate 100 in the thickness direction, and is constituted including a center communicating hole 108 having a circular cross section, and four outer circumference communicating holes 110 extending at a specified length in the circumference direction formed at the circumference thereof.

Figure 4:
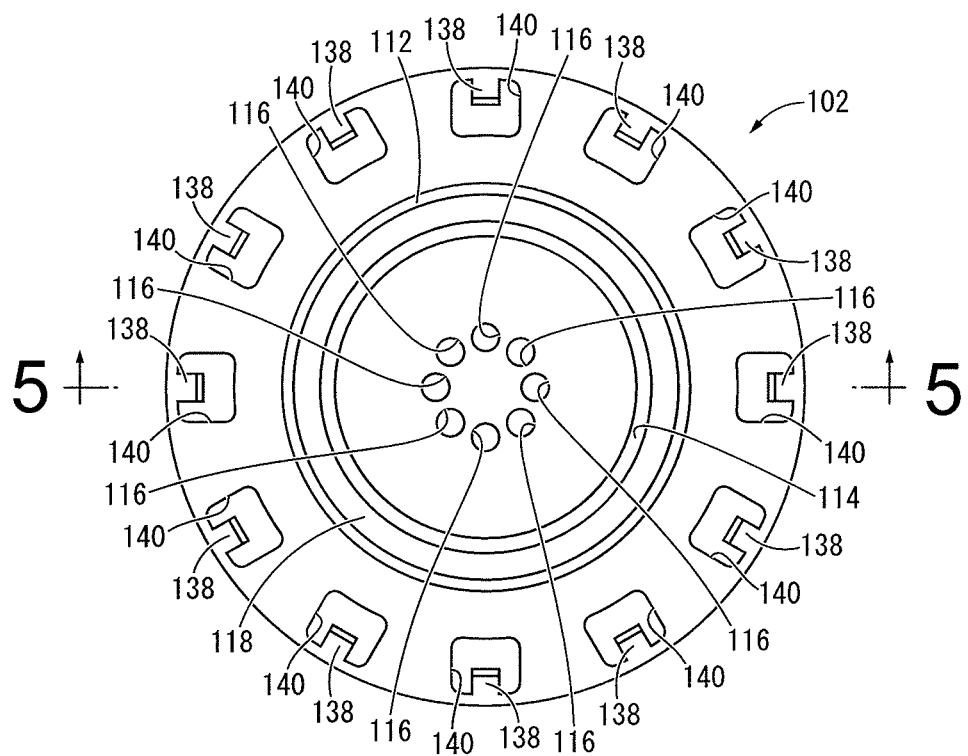
FIG. 4 is a plan view of a second partition plate constituting the engine mount shown in FIG. 1.
Figure 5:
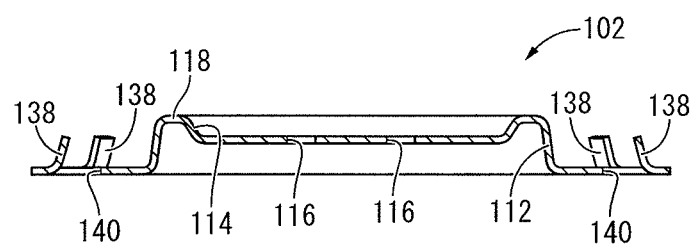
FIG. 5 is a cross sectional view taken along line 5-5 in FIG. 4.

As shown in FIG. 4 and FIG. 5, the second partition plate 102 is a roughly stepped round disk shape, and exhibits a hat shape for which the center side is positioned further upward in relation to the outer circumference side than a ring shaped inner circumference step part 112 provided on the radial direction center part. Also, a holding recess 114 is formed at the center part of the second partition plate 102 projecting upward. This holding recess 114 is a circular recess that opens upward, and on the bottom surface are formed lower communicating holes 116 piercing in the thickness direction as a plurality of communicating holes. Furthermore, by formation of the holding recess 114, an abutting projection 118 for which the periphery of the holding recess 114 extends in a ring shape is provided at the center part of the second partition plate 102. The outer circumference step part 104 of the first partition plate 100 is greater in diameter than the inner circumference step part 112 of the second partition plate 102.

Then, the first partition plate 100 is overlapped from above in relation to the second partition plate 102, and the inner circumference step part 112 of the second partition plate 102 is inserted in the outer circumference step part 104 of the first partition plate 100, and also, the outer circumference parts are overlapped vertically mutually abutting, constituting the partition member 64. Also, the center part of the first partition plate 100 and the abutting projection 118 of the second partition plate 102 are in contact vertically along the entire circumference, and by the opening part of the holding recess 114 provided on the second partition plate 102 being covered by the center part of the first partition plate 100, a holding area 120 having a circular inner circumference surface is formed on the partition member 64. This holding area 120, in a state with the partition member 64 supported by the second mounting member 14 described later, is in communication with the pressure receiving fluid chamber 66 through the upper communicating hole 106, and also is in communication with the excitation fluid chamber 68 through the lower communicating hole 116, and the fluid flow path by which the pressure receiving fluid chamber 66 and the excitation fluid chamber 68 are in mutual communication is formed by the upper communicating hole 106, the holding area 120, and the lower communicating hole 116.

Furthermore, the outer circumference step part 104 of the first partition plate 100 has a larger diameter than the inner circumference step part 112 of the second partition plate 102, and the outer circumference step part 104 and the inner circumference step part 112 are facing each other separated by a specified distance in the radial direction. As a result, a ring-shaped area 122 is formed extending continuously along the entire circumference between the outer circumference step part 104 and the inner circumference step part 112 in the radial direction. This ring-shaped area 122 is separated from the holding area 120 by the abutting projection 118 of the second partition plate 102 abutting the first partition plate 100 in the axial direction. Also, the ring-shaped area 122 is filled with non-compressible fluid the same as with the pressure receiving fluid chamber 66 and the holding area 120 and the like. The shape and cross section area and the like of the ring-shaped area 122 are not particularly restricted, but when doing the work of eliminating the air described later, it is necessary to have a size for which it is possible to exhaust it to the outside without having air remaining between the outer circumference step part 104 and the inner circumference step part 112, and for example these can be set according to the water current strength or the like used with the work of eliminating the air.

Figure 6:
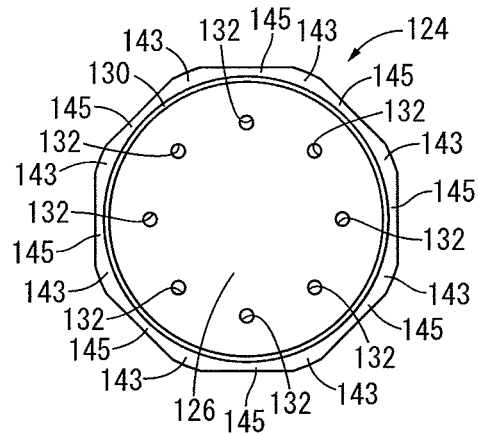
FIG. 6 is a plan view of a movable membrane constituting the engine mount shown in FIG. 1.
Figure 7:
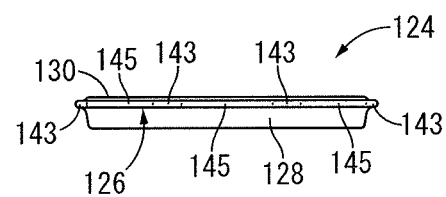
FIG. 7 is a front view of the movable membrane shown in FIG. 6.

A movable membrane 124 is also installed in the holding area 120. As shown in FIG. 6 and FIG. 7, the movable membrane 124 is overall formed as a thin-walled, plate shaped rubber elastic body, and a plate shaped part 126 for which the outer circumference part is formed as an integral unit exhibiting an external shape of roughly an octagon for which the corners are chamfered with a planar view (axial direction view) is equipped on the top end of the center part which is a roughly round disk shape. Furthermore, a ring shaped grasping part 128 projecting in the axial direction downward is formed as an integral unit at the boundary of the center part and the outer circumference part of the plate shaped part 126. Yet further, a ring shaped seal projection 130 that projects toward the opposite side as the grasping part 128 from the plate shaped part 126 is formed as an integral unit on the movable membrane 124. With the movable membrane 124 of this embodiment, the outer circumference surface of the plate shaped part 126 is a roughly octagonal shape, and also, the outer circumference surface of the grasping part 128 is roughly circular, and the shape of the outer circumference surface is different at the top part and bottom part.

Furthermore, a plurality of through holes 132 are formed on the movable membrane 124. The through holes 132 are small diameter circular holes, and are pierced vertically in the thickness direction of the plate shaped part 126 further to the inner circumference side than the grasping part 128 in a roughly fixed cross section shape.

Figure 8:
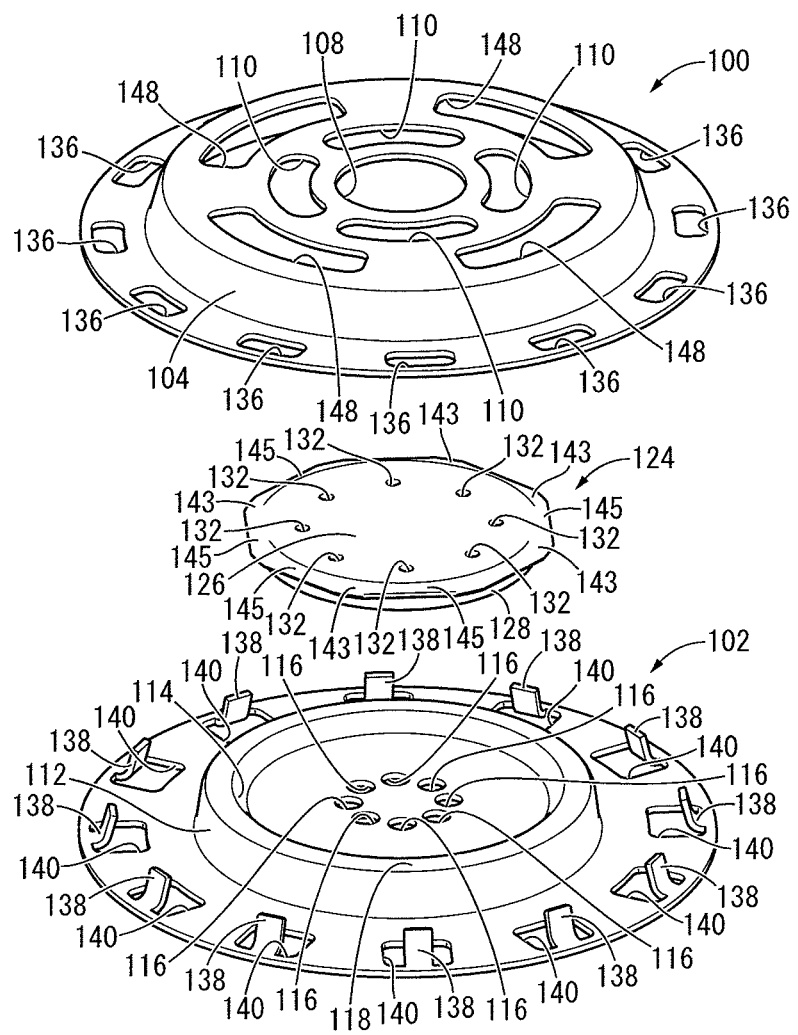
FIG. 8 is an exploded perspective view of a partition member constituting the engine mount shown in FIG. 1.

Then, as shown in FIG. 1 and FIG. 8, the movable membrane 124 is installed expanding in the axis perpendicular direction in relation to the holding area 120 formed between overlapping of the first partition plate 100 and the second partition plate 102, and the outer circumference end grasping part 128 is grasped between the surface facing opposite in the axial direction of the first partition plate 100 and the second partition plate 102. Also, the seal projection 130 of the movable membrane 124 is compressed in the axial direction by being pressed by the first partition plate 100, and between the overlapping surfaces of the movable membrane 124 and the first partition plate 100 is sealed fluid tight by the seal projection 130. Also, with the movable membrane 124 which exhibits a roughly octagonal shape with a planar view, the outer circumference surface of its corner 143 is arranged near the inner circumference surface of the circular holding area 120, and the installation position of the movable membrane 124 is prevented from becoming displaced greatly in the axis perpendicular direction within the holding area 120. The partition member 64 is formed with the first partition plate 100 and the second partition plate 102 overlapping in the axial direction, so the movable membrane 124 is easily installed inside the holding area 120.

In the state with the partition member 64 attached to the second mounting member 14 described later, the movable membrane 124 is installed on the fluid flow path constituted by the holding area 120 and the upper and lower communicating holes 106 and 116, and by elastic deformation of the movable membrane 124 being allowed, the fluid flow path is in a substantially communicating state, and also, by the elastic deformation of the movable membrane 124 being restricted, the fluid flow path is substantially in a blocked state. Furthermore, the pressure of the pressure receiving fluid chamber 66 is applied through the upper communicating hole 106 to the top surface on the movable membrane 124, and the pressure of the excitation fluid chamber 68 is applied through the lower communicating hole 116 on the lower surface. Then, the movable membrane 124 is made to be elastically deformed in the thickness direction based on the relative pressure difference of the pressure receiving fluid chamber 66 and the excitation fluid chamber 68.

The first partition plate 100 and the second partition plate 102 also have a fixing mechanism 134 provided that mutually fixes them to the outer circumference part, and the movable membrane 124 is grasped between the first partition plate 100 and the second partition plate 102 and positioned inside the holding area 120. More specifically, in the state with the first partition plate 100 and the second partition plate 102 overlapping, a plurality of perforation windows 136 and claw-shaped parts 138 are formed respectively at each corresponding position of the outer circumference part of the first and second partition plates 100 and 102, and the fixing mechanism 134 each includes a plurality of the perforation windows 136 and the claw-shaped parts 138.

The perforation windows 136 are holes piercing in the thickness direction further to the outer circumference side than the outer circumference step part 104 of the first partition plate 100, and twelve perforation windows 136 having a cross section shape extending a specified length in the circumference direction are provided at equal intervals for roughly one circumference.

The claw-shaped parts 138 exhibit a tongue-shape projecting in the thickness direction of the second partition plate 102, and are formed as an integral unit further to the outer circumference side than the inner circumference step part 112 of the second partition plate 102. Furthermore, the claw-shaped parts 138 are formed at positions corresponding to the perforation windows 136 so as to be able to be inserted in the perforation windows 136, and twelve claw-shaped parts 138 are provided at equal intervals on roughly one circumference. The claw-shaped parts 138 are formed by, for example die-punching a die-punch hole 140 so that the tongue piece projecting toward the inside in the radial direction from the edge part of the outer circumference side remains in relation to the second partition plate 102 outer circumference part, and by having that tongue piece be bent and deformed to project upward.

Figure 9:
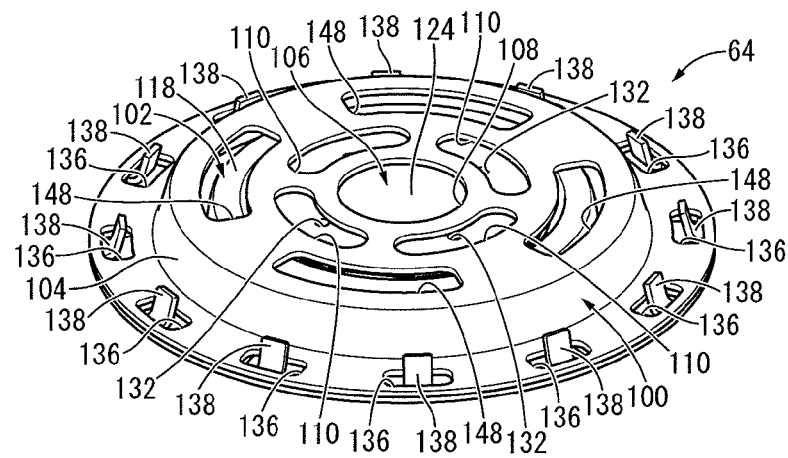
FIG. 9 is a perspective view showing the partition member shown in FIG. 8, and is a drawing showing the state before the first partition plate and the second partition plate are fixed by a claw-shaped part.
Figure 10:
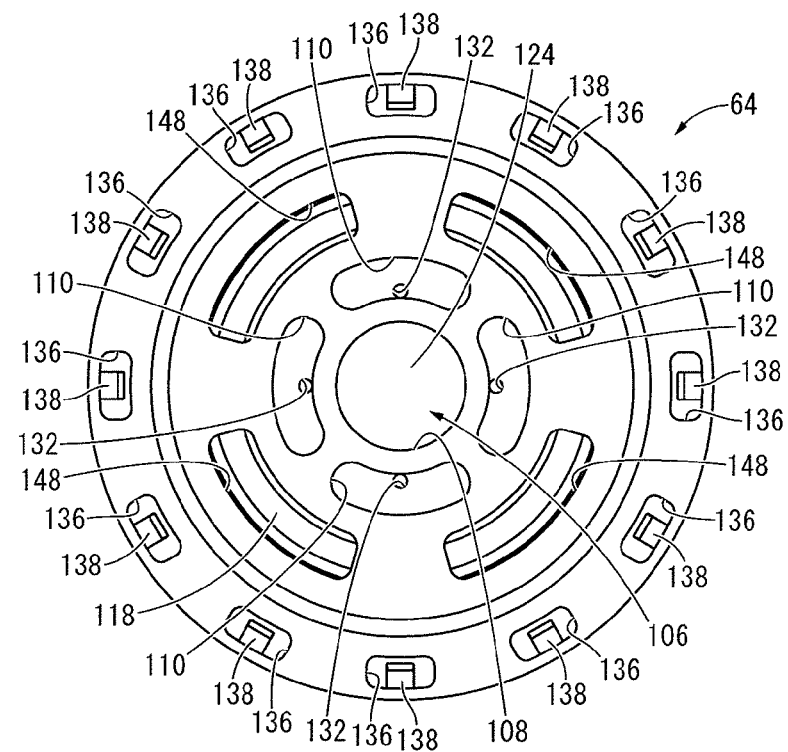
FIG. 10 is a plan view showing the partition member shown in FIG. 9.
Figure 11:
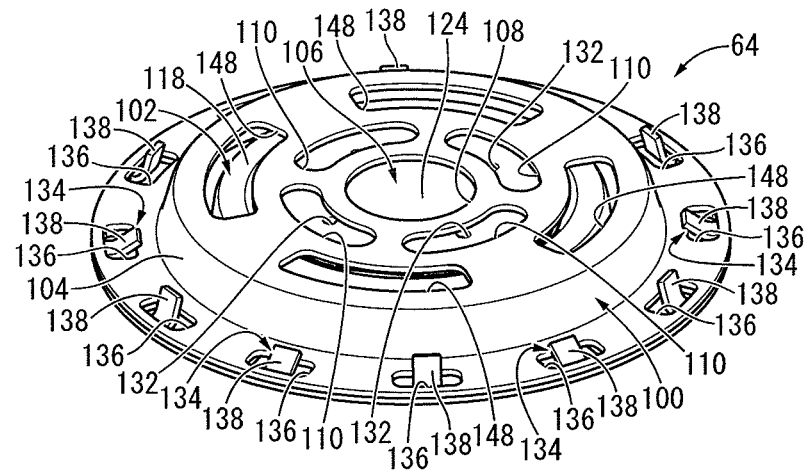
FIG. 11 is a perspective view showing the partition member shown in FIG. 8, and is a drawing showing the state after the first partition plate and the second partition plate are fixed by the claw-shaped part.

Then, by having the first partition plate 100 and the second partition plate 102 overlap vertically, the plurality of claw-shaped parts 138 are inserted respectively in the plurality of perforation windows 136 (see FIG. 9, FIG. 10). Furthermore, at least one of the claw-shaped parts 138 inserted in the perforation window 136 is deformed so as to have the tilt angle be smaller in relation to the plane expanding in the axis perpendicular direction and latched with the circumference edge part of the perforation window 136 (see FIG. 11, FIG. 12). With this embodiment, six claw-shaped parts 138, every other one in the circumference direction, are plastically deformed, and are latched with the circumference edge part of the perforation window 136. As a result, the first partition plate 100 and the second partition plate 102 are positioned in relation to each other in the axial direction by latching of the claw-shaped parts 138 and the perforation windows 136 circumference edge part, and thus the fixing mechanism 134 which forms the partition member 64 for mutually fixing the first partition plate 100 and the second partition plate 102 is constituted including six each of the perforation windows 136 and the claw-shaped parts 138.

This fixing of the first partition plate 100 and the second partition plate 102 can be performed in advance in air separately from the work of attaching the partition member 64 to the second mounting member 14, and by doing that, it is possible to do simple processing of the claw-shaped parts 138 and latching them in the circumference edge part of the perforation windows 136. Also, by combining the first partition plate 100, the second partition plate 102, and the movable membrane 124 to constitute the partition member 64 before doing the work of attaching to the second mounting member 14, it is possible to handle this as one part, making parts management and transport easier.

Figure 13:
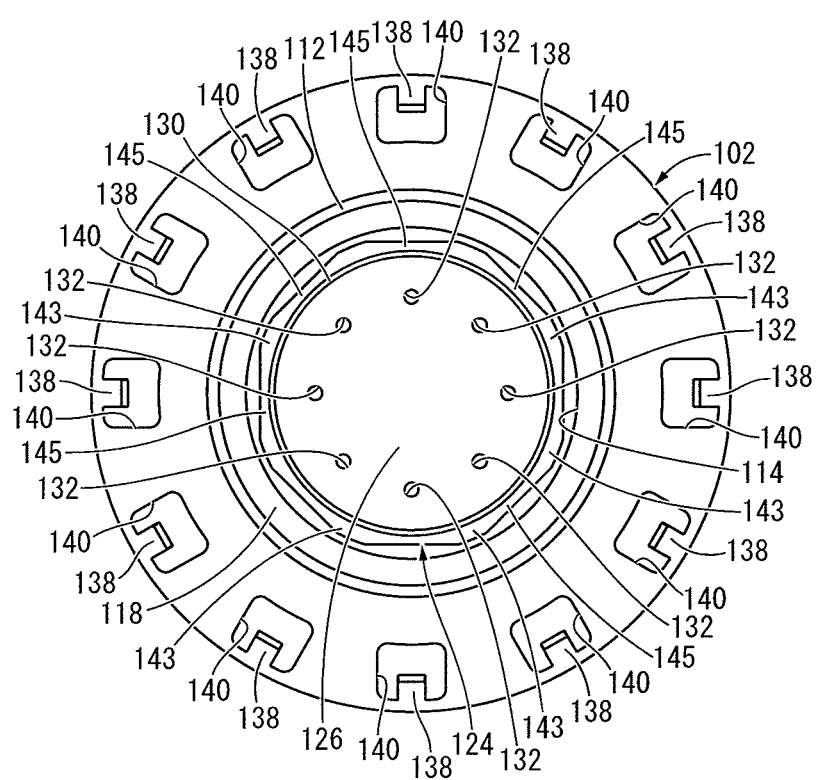
FIG. 13 is a plan view showing the state with the movable membrane shown in FIG. 6 arranged inside a holding recess of the second partition plate shown in FIG. 4.

Also, as shown in FIG. 13, the inner diameter dimensions of the holding area 120 formed between the facing surfaces of the first partition plate 100 and the second partition plate 102 are larger than the maximum dimension with the axis perpendicular direction of the movable membrane 124 (length dimension in the diagonal direction). As a result, the outer circumference surface of the movable membrane 124 and the inner circumference surface of the holding area 120 are arranged facing opposite separated along the entire circumference in the axis perpendicular direction, and an outer circumference area 142 is formed between the opposite facing surfaces of the outer circumference surface of the movable membrane 124 and the inner circumference surface of the holding area 120. This outer circumference area 142 is a ring shaped area that is continuous along the entire circumference, and is formed further to the inside than the ring-shaped area 122 sandwiching the abutting projection 118 of the second partition plate 102.

Furthermore, the second partition plate 102 side (in FIG. 1, the bottom side) of the outer circumference area 142 is formed between the facing surfaces of the outer circumference surface of the grasping part 128 of the circular movable membrane 124, and the inner circumference surface of the circular holding area 120, and has a roughly constant width dimension (radial direction dimension) along the entire circumference. Meanwhile, the first partition plate 100 side (in FIG. 1, the top side) of the outer circumference area 142 is formed between the opposite facing surfaces of the outer circumference surface of the plate shaped part 126 of the movable membrane 124 formed in a roughly octagonal shape and the inner circumference surface of the circular holding area 120, and has a width dimension varying along the circumference. Specifically, a narrowing area 144 with a small width dimension is formed between the opposite facing surfaces of the peripheral face of the corner 143 of the plate shaped part 126 and the inner circumference surface of the holding area 120, and also, a widening area 146 with a larger width dimension than the narrowing area 144 is formed between the opposite facing surfaces of the peripheral face of the side 145 of the plate shaped part 126 and the inner circumference surface of the holding area 120. In other words, the narrowing area 144 and the widening area 146 are respectively partially provided on the circumference on the outer circumference area 142, and are alternately arranged in the circumference direction.

Air exhaust holes 148 are also formed on the first partition plate 100. As shown in FIG. 2 and FIG. 3, the air exhaust holes 148 are holes that pierce in the thickness direction further to the outer circumference side than the outer circumference communicating holes 110 in the center part of the first partition plate 100, and four air exhaust holes 148 arranged on the same circumference respectively extend a specified length in the circumference direction.

Figure 12:
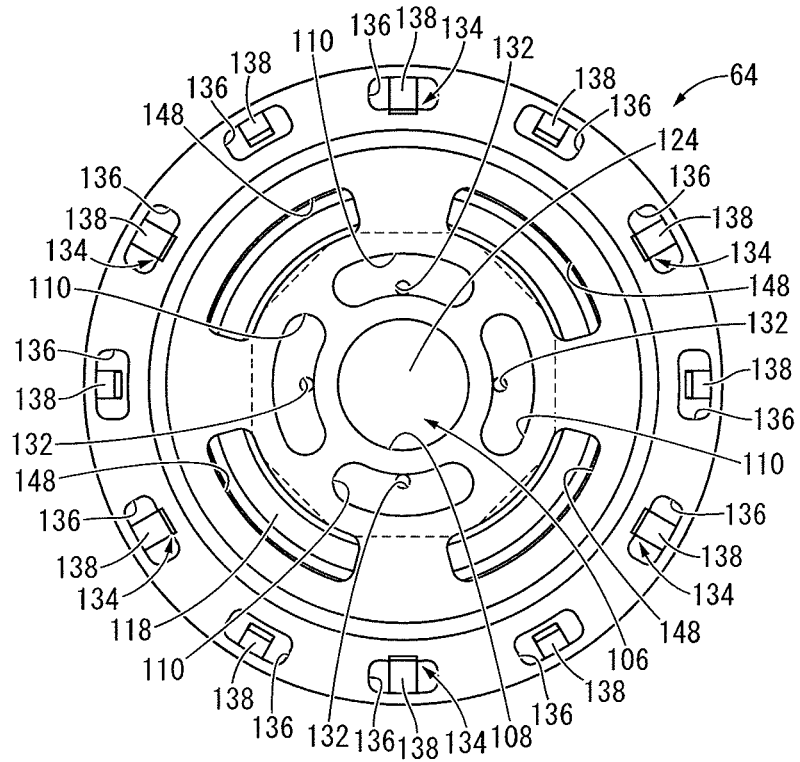
FIG. 12 is a plan view of the partition member shown in FIG. 11.

Also, as shown in FIG. 1 and FIG. 12, with the air exhaust holes 148, the forming positions in the radial direction are above the circumference corresponding to the abutting projections 118 of the second partition plate 102, and the radial direction dimension (width dimension) is greater than the upper end surface of the abutting projection 118. As a result, while the air exhaust holes 148 have the width direction center part covered from below by the abutting projection 118, the outer circumference side end part is in communication with the ring-shaped area 122, and also, the inner circumference side end part is in communication with the outer circumference area 142. Then, the ring-shaped area 122 and the outer circumference area 142 are open to the outside through the respective air exhaust holes 148. The air exhaust holes 148 provide at the outer circumference side than the abutting projections 118 the second air vent holes that is formed piercing the part constituting the wall part of the ring-shaped area 122 on the first partition plate 100.

Yet further, as shown by the dotted line in FIG. 12, the air exhaust holes 148 are formed extending between the adjacent corners 143 of the movable membrane 124 in the circumference direction, and both end parts in the circumference direction are in communication with the narrowing area 144, and also, the circumference direction center part is in communication with the widening area 146. The air exhaust holes 148 provide at the inner circumference side than the abutting projections 118 the first air vent holes that is formed piercing the part constituting the wall part of the outer circumference area 142 on the first partition plate 100, and each of the air exhaust holes 148 exhibit both functions of the first air vent holes and the second air vent holes.

Also, the die-punch holes 140 are formed on the second partition plate 102 with their inner circumference side end parts extending to the wall part of the ring-shaped area 122, and the ring-shaped area 122 opens to the outside through the die-punch holes 140. In this way, the die-punch holes 140 are formed piercing the part constituting the wall part of the ring-shaped area 122 on the second partition plate 102, and are another of the second air vent holes with this embodiment.

The partition member 64 with this kind of constitution is attached to the second mounting member 14 in a water tank filled with non-compressible fluid (hereafter also called "in liquid"). Specifically, the outer circumference end part of the partition member 64 is sandwiched in the axial direction between the second mounting member 14 and the support member 60, and the partition member 64 is fixed to the second mounting member 14 by the second mounting member 14 and the support member 60 being fixed by crimping by the crimping piece 48 of the outer circumference fixing member 44.

The first and second partition plates 100 and 102 and the movable membrane 124 are assembled in advance in air as the partition member 64, and during the work of attaching the partition member 64 to the second mounting member 14, those first and second partition plates 100 and 102 and the movable membrane 124 are handled as one part. Because of that, parts management and transport and the like becomes easy, and the substantial number of parts during the work of assembling in liquid becomes lower, making the work more efficient.

Furthermore, with the claw-shaped parts 138 inserted in the perforation windows 136, the other six claw-shaped parts 138 which do not constitute the fixing mechanism 134 are inserted in the center tube shaped part 24 of the second mounting member 14, and overlap on the inner circumference surface of the fluid chamber 63 at least at the base end part. As a result, the partition member 64 is positioned in a direction orthogonal (axis perpendicular direction) to the overlapping direction of the first partition plate 100 and the second partition plate 102 within the fluid chamber 63 before being fixed on the second mounting member 14, and the outer circumference end part of the partition member 64 is grasped in the axial direction between the second mounting member 14 and the support member 60. In this way, a positioning mechanism 150 for positioning the partition member 64 in the axis perpendicular direction within the fluid chamber 63 is constituted by the other six claw-shaped parts 138 which do not constitute the fixing mechanism 134. To prevent contact of the claw-shaped part 138 tip edge on the sealing rubber layer 32, it is preferable that the tilt angle (rise angle) from the flat surface expanding in the axis perpendicular direction of the claw-shaped parts 138 be less than 90°.

Also, when mounting the partition member 64 formed by combining in advance in air the first partition plate 100, the second partition plate 102, and the movable membrane 124 on the second mounting member 14 in a water tank filled with non-compressible fluid, it becomes easy to remove the air which has entered between the first partition plate 100 and the second partition plate 102.

Specifically, the partition member 64 formed in advance in air is attached in liquid to the main rubber elastic body 16 integral vulcanized molded article and the flexible film 34 integral vulcanized molded article, and also the support rubber elastic body 62 integral vulcanized molded article. At that time, the air that has entered between the holding area 120 wall part and the movable membrane 124 is eliminated to the outside (in liquid) through the upper and lower communicating holes 106 and 116 further to the inner circumference side than the grasping part 128. In particular, with this embodiment, through holes 132 are faulted piercing in the thickness direction in the movable membrane 124, so we can also expect release of the air that has entered the bottom side sandwiching the movable membrane 124 through the through holes 132.

Also, the air that has entered the outer circumference area 142 further to the outer circumference side than the grasping part 128 is eliminated to the outside (in liquid) through the air exhaust hole 148. In fact, a widening area 146 is provided with the distance between the opposite facing surfaces of the inner circumference surface of the holding area 120 and the outer circumference surface of the movable membrane 124 made larger at a plurality of locations on the circumference on the outer circumference area 142, and air exhaust holes 148 are formed at the part constituting the wall part of the widening area 146 on the first partition plate 100. As a result, at the widening area 146, the air holding power based on the interface tension or the like is suppressed, and also, the air bubble buoyancy is increased by forming large air bubbles, so the air that has entered the outer circumference area 142 is efficiently removed through the air exhaust holes 148 formed on the wall part of the widening area 146.

Furthermore, with this embodiment, the widening area 146 is formed by having the movable membrane 124 outer circumference surface shape and the holding area 120 inner circumference surface shape be different, and the widening area 146 is formed across a wide range on the circumference. Specifically, the outer circumference surface of the movable membrane 124 is a roughly octagonal shape with a planar view, and the holding area 120 has a roughly circular shape with a planar view, and the widening area 146 is formed using the fact that the distance between opposite facing surfaces of the peripheral face of the side 145 of the movable membrane 124 and the inner circumference surface of the holding area 120 is bigger than the distance between the opposite facing surfaces of the peripheral face of the corner 143 of the movable membrane 124 and the inner circumference surface of the holding area 120. Because of that, the widening area 146 goes along a wide range on the circumference on the outer circumference area 142, and the outer circumference area 142 air holding power is suppressed.

The air remaining in the outer circumference area 142 can be removed using water current (jet stream of non-compressible fluid). Specifically, the water current that enters the widening area 146 from the air exhaust holes 148 progresses to both circumference direction sides from that widening area 146, and flows out to the outside through the other air exhaust holes 148 communication with the other widening areas 146. As a result, the air inside the outer circumference area 142 is eliminated more efficiently, and it is possible to prevent air from remaining.

In fact, because the air exhaust holes 148 are formed on the wall part of the widening area 146, the flow resistance acting on the water current is suppressed, and it is easier for the water current to enter the outer circumference area 142, and for the air inside the outer circumference area 142 to easily be pushed and flowed by the water current.

Additionally, with this embodiment, the bottom side part of the outer circumference area 142 formed between the opposite facing surfaces of the outer circumference surface of the grasping part 128 of the movable membrane 124 and the inner circumference surface of the holding area 120 has a wider width than the top side part formed between the opposite facing surfaces of the outer circumference surface of the plate shaped part 126 of the movable membrane 124 and the inner circumference surface of the holding area 120. Because of that, the water current that has entered the widening area 146 flows in the circumference direction without being hindered at the narrowing area 144 for which the flow resistance becomes large, and it is possible to exhaust the air to the outside along the entire circumference. The narrowing area 144 is a narrow range in the axial direction, so because the water current flows in the bottom side part, the air of the narrowing area 144 is sucked out to the water current side based on the negative pressure due to the flow speed, and it is possible to sufficiently prevent air from remaining.

Also, the air that has entered between the overlapping surfaces of the first partition plate 100 and the second partition plate 102 is made to be eliminated to the outside through the air exhaust holes 148 and the die-punch holes 140 from the ring-shaped area 122 formed between the overlapping surfaces of those first partition plate 100 and the second partition plate 102. Specifically, by providing a ring-shaped area 122 having a sufficiently large width (radial direction dimension) and height (axial direction dimension) between the overlapping surfaces of the first partition plate 100 and the second partition plate 102, at the ring-shaped area 122, the air holding power based on the interface tension is suppressed, and also, the air bubble buoyancy is increased by forming large air bubbles. Because of that, the air that has entered between the overlapping surfaces of the first partition plate 100 and the second partition plate 102 (ring-shaped area 122) is more easily separated from the partition member 64, and is discharged to the outside quickly in liquid.

In other words, since the first partition plate 100 and the second partition plate 102 are fixed in advance in air, it is possible to easily position and fix them in the axial perpendicular direction of the first partition plate 100 and the second partition plate 102 without providing a special positioning constitution. Because of that, positioning by abutting of the outer circumference step part 104 of the first partition plate 100 and the inner circumference step part 112 of the second partition plate 102 is unnecessary, and it is possible to form the ring-shaped area 122 for venting air between the opposite facing surfaces of the outer circumference step part 104 and the inner circumference step part 112.

The air remaining in the ring-shaped area 122 can also be eliminated using water current (jet stream of non-compressible fluid). Specifically, the water current that has entered from the air exhaust holes 148 into the ring-shaped area 122 progresses in the circumference direction inside the ring-shaped area 122, and flows out to the outside from the other air exhaust holes 148. At that time, the air remaining in the ring-shaped area 122 is pushed and flowed by the pressure of the water current, and since it is eliminated to the outside together with the water current, the air inside the ring-shaped area 122 is actively eliminated, and it is possible to prevent the remaining of air inside the ring-shaped area 122. With this embodiment, since the air exhaust holes 148 are in communication with both the outer circumference area 142 and the ring-shaped area 122, by blowing the water current into the air exhaust holes 148, it is possible to simultaneously exhaust the air of the outer circumference area 142 and the air of the ring-shaped area 122.

Furthermore, die-punch holes 140 formed on the second partition plate 102 are opened on the wall part of the ring-shaped area 122. Because of that, the water current that has entered from the air exhaust holes 148 is also eliminated to the outside through the die-punch holes 140, and eliminating of air within the ring-shaped area 122 is more effectively realized. In fact, the die-punch holes 140 are covered by the support member 60 and blocked in a state with the partition member 64 supported by the second mounting member 14, so an adverse effect on the vibration damping performance is avoided.

Working in this way, the air that has entered between each member of the first and second partition plates 100 and 102 and the movable membrane 124 when assembling the partition member 64 in air in advance is easily eliminated in liquid, and mixing of air in the fluid chamber 63 is prevented. Because of that, it is possible to avoid a decrease in vibration damping performance due to the compressibility of air or the like, and possible to effectively obtain the target vibration damping effect. Also, with an active type engine mount 10 which requires high level vibration damping performance as well, by preventing mixing of air in the fluid chamber 63, it is possible to realize excellent vibration damping performance which can fulfill the required characteristics.

The engine mount 10 formed while preventing mixing of air in the fluid chamber 63 is mounted on the vehicle by having the first mounting member 12 attached to the automobile power unit (not shown), and also by the second mounting member 14 attached to the vehicle body (not shown) via the housing 84 (leg part 89) of the actuator 78.

In this vehicle mounted state, when the low frequency, high amplitude vibration correlating to engine shake is input between the first mounting member 12 and the second mounting member 14, fluid flow occurs through the orifice path 76 between the pressure receiving fluid chamber 66 and the equilibrium fluid chamber 70, and a vibration damping effect (high damping effect) based on the flow action such as the resonance effect of the fluid or the like is exhibited. Furthermore, the movable membrane 124 has its elastic deformation restricted by the first and second partition plates 100 and 102, so it is not possible to sufficiently follow the amplitude of the input vibration, the pressure receiving fluid chamber 66 and the excitation fluid chamber 68 are substantially blocked, and fluid pressure absorption by the elastic deformation of the support rubber elastic body 62 is prevented. Because of that, the fluid flow volume is effectively ensured through the orifice path 76, and the target vibration damping effect is effectively exhibited.

Meanwhile, during input of high frequency, low amplitude vibration correlating to idling vibration or running muffled sound or the like, the orifice path 76 is substantially blocked by anti-resonance, and also, the pressure receiving fluid chamber 66 and the excitation fluid chamber 68 are substantially in communication by minute deformation of the movable membrane 124. Furthermore, the excitation member 54 is excited at the frequency and amplitude corresponding to the input vibration by the actuator 78, and active excitation force is applied to the excitation fluid chamber 68. By this excitation force being transmitted to the pressure receiving fluid chamber 66, a counteracting vibration damping effect to the input vibration is exhibited, and a high action spring reaction due to blocking of the orifice path 76 is avoided. In particular, with this embodiment, through holes 132 are formed on the movable membrane 124, and the excitation force of the excitation fluid chamber 68 is transmitted to the pressure receiving fluid chamber 66 not only by the minute deformation of the movable membrane 124 but also by the fluid flow through the through holes 132 as well, so the active vibration damping effect is more effectively exhibited.

Above, we described an embodiment of the present invention in detail, but the present invention is not limited to that specific description. For example, with this embodiment, by making the outer circumference surface of the movable membrane 124 be a polygon (octagon) shape, and also the inner circumference surface of the holding area 120 be a circle, the widening area 146 was formed, but the widening area is not necessarily limited to being an item formed by combining a polygonal movable membrane and a circular holding area. Specifically, for example, if the movable membrane outer circumference surface is made to be circular and the holding area inner circumference surface is made to be a polygon, a widening area is formed between the movable membrane outer circumference surface and the holding area corner inner circumference surface. Furthermore, for example, it is also possible to form the widening area on the recess forming part by forming a recess that continues along the entire length of the thickness direction and opens at least␣at one of on the movable membrane outer circumference surface or on the holding area inner circumference surface.

Also, the ring-shaped area 122 provided on the outer circumference side of the holding area 120 may also be omitted depending on the constitution of the first partition plate and the second partition plate, and is not essential. In specific terms, for example, the ring-shaped area may be omitted with a constitution such as one by which the first partition plate and the second partition plate center parts overlap in the thickness direction without respectively projecting in the thickness direction.

Also, the first air vent holes and the second air vent holes are not limited to being items formed jointly using one hole such as the air exhaust holes 148 of the embodiment noted above, and can also be formed independently of each other. Furthermore, the first air vent holes may be formed piercing the second partition plate 102, or may be formed on both the first and second partition plates 100 and 102 with at least one being blocked in a state with the partition member 64 supported by the second mounting member 14. Furthermore, with the embodiment noted above, as the second air vent holes, the air exhaust holes 148 formed on the first partition plate 100 and the die-punch holes 140 formed on the second partition plate 102 were provided, but the second air vent holes can also be formed on only one of the first partition plate 100 or the second partition plate 102.

Also, with the embodiment noted above, only six of the twelve claw-shaped parts 138 were deformed after insertion to the perforation window 136, and these were latched with the circumference edge part of the perforation window 136 to constitute the fixing mechanism 134, but it is also possible to have all the claw-shaped parts 138 latched with the circumference edge part of the perforation window 136 to constitute the fixing mechanism 134.

Furthermore, the number of claw-shaped parts 138 and perforation windows 136 formed are only shown by example, and any number of one or greater can be formed. Also, the claw-shaped parts 138 can be formed on the first partition plate 100, and the perforation windows 136 can be formed on the second partition plate 102, or both the perforation windows 136 and the claw-shaped parts 138 can be formed on each of the partition plates 100 and 102.

Also, with the embodiment noted above, the electromagnetic actuator 78 was shown as an example of the actuator for applying excitation force to the excitation member 54, but for example it is also possible to use a pneumatic actuator to make negative pressure suction force act as the excitation force of the excitation member 54 by applying negative pressure periodically from outside on the bottom surface of the excitation member 54.

Also, the application range of the present invention is not necessarily limited to fluid-filled active vibration damping devices that can achieve a damping effect using an active excitation force, and it is also possible to apply this to a passive fluid-filled vibration damping device that does not have the actuator 78, the excitation member 54, the support rubber elastic body 62 or the like.

In specific terms, for example the first mounting member 12 and the second mounting member 14 top edge part is connected by the main rubber elastic body 16 and also, attached to the second mounting member 14 bottom edge part is a flexible membrane in a thin-walled, round disk shape or a dome shape, and a fluid chamber is formed between the axial direction opposite facing surfaces of the main rubber elastic body 16 and the flexible membrane. Also, in the fluid chamber is installed expanding in the axis perpendicular direction a partition member 64 made by arranging the movable membrane 124 between the first partition plate 100 and the second partition plate 102, and the outer circumference end part of the partition member 64 is supported by the second mounting member 14. Furthermore, the fluid chamber is divided in two vertically sandwiching the partition member 64, with the pressure receiving fluid chamber 66 for which a portion of the wall part is constituted by the main rubber elastic body formed on one side, and the equilibrium fluid chamber 70 for which a portion of the wall part is constituted by a flexible membrane is formed on the other side, and the pressure receiving fluid chamber 66 and the equilibrium fluid chamber 70 are mutually in communication through the orifice path formed on the partition member 64. With a passive fluid-filled vibration damping device having this kind of constitution as well, it is possible to apply the present invention, to have formation of the partition member 64 equipped with the movable membrane 124 performed in air, and also to prevent having air remain. With the fluid-filled vibration damping device of the constitution noted above, the pressure receiving fluid chamber 66 is used as the first fluid chamber, and the equilibrium fluid chamber 70 is used as the second fluid chamber.

Also, the application scope of the present invention is not limited to being for an automobile fluid-filled active vibration damping device, but for example can also be applied to a fluid-filled active vibration damping device used for motorcycles, railway vehicles, industrial vehicles or the like. Furthermore, the fluid-filled active vibration damping device of the present invention is not used only as an engine mount, but can also be used as a subframe mount, a body mount, a diff mount or the like.

What is claimed is:

1. A fluid-filled vibration damping device comprising:
   a first mounting member;
   a second mounting member;
   a main rubber elastic body elastically connecting the first and second mounting members;
   a fluid chamber filled with a non-compressible fluid;
   a partition member supported by the second mounting member, dividing the fluid chamber into a first fluid chamber and a second fluid chamber, and having a holding area;
   a movable membrane held and arranged in the holding area of the partition member with an outer circumference part thereof being grasped by the partition member in a thickness direction; and
   communicating holes being formed with the partition member so that pressures of the first fluid chamber and the second fluid chamber are applied to opposite surfaces of the movable membrane through the communicating holes so that the movable membrane undergoes elastic deformation based on pressure difference between the first fluid chamber and the second fluid chamber,
   wherein the partition member comprises a first partition plate and a second partition plate overlapping, and the holding area is formed between overlapping surfaces of center parts of the first partition plate and the second partition plate,
   at least one claw-shaped part and at least one perforation window are formed at respective corresponding positions of an outer circumference part of the first partition plate and an outer circumference part of the second partition plate, and a fixing mechanism is constituted with the claw-shaped part latched in a circumference edge part of the perforation window to fix the first partition plate and the second partition plate,
   a widening area is provided between an outer circumference surface of the movable membrane and an inner circumference surface of the holding area, by making a distance between facing surfaces large partially at a circumference, and
   at least one of the first partition plate and the second partition plate has at least one first air vent hole that is pierced at a part constituting a wall part of the widening area.

2. The fluid-filled vibration damping device according to claim 1, wherein both the center part of the first partition plate and the center part of the second partition plate project to one side in the thickness direction, the center part of the first partition plate has a wider diameter than the center part of the second partition plate, the center part of the second partition plate is inserted in the center part of the first partition plate, a ring-shaped area is formed in a radial direction between the center part of the first partition plate and the center part of the second partition plate, and at least one second air vent hole is pierced in a wall part of the ring-shaped area.

3. The fluid-filled vibration damping device according to claim 2, wherein the at least one second air vent hole comprises a plurality of second air vent holes, and the second air vent holes are respectively formed on the first partition plate and the second partition plate, while at least one of the second air vent holes is closed in a state with the partition member supported by the second mounting member.

4. The fluid-filled vibration damping device according to claim 1, wherein the inner circumference surface of the holding area is formed in a circular shape, while the outer circumference surface of the movable membrane is formed in a polygonal shape, and the widening area is formed between peripheral faces at sides of the movable membrane and the inner circumference surface of the holding area, while a narrowing area of a narrower width than the widening area is formed between peripheral faces at corners of the movable membrane and the inner circumference of the holding area.

5. The fluid-filled vibration damping device according to claim 1, wherein a through hole is formed piercing the movable membrane in the thickness direction.

6. The fluid-filled vibration damping device according to claim 1, wherein the at least one claw-shaped part comprises a plurality of the claw-shaped parts while the at least one perforation window comprises a plurality of the perforation windows, and the fixing mechanism is constituted by at least one of the claw-shaped parts being latched with the circumference edge part of the corresponding perforation window, and also, a positioning mechanism is constituted which positions the partition member within the fluid chamber in a direction orthogonal to an overlapping direction of the first partition plate and the second partition plate, by contacting at least one of the claw-shaped parts with an inner circumference surface of the fluid chamber.

7. The fluid-filled vibration damping device according to claim 1, wherein the first fluid chamber is a pressure receiving fluid chamber whose wall is partially defined by the main rubber elastic body, while the second fluid chamber is an excitation fluid chamber whose wall is partially defined by an excitation member, and also, an actuator is provided which applies excitation force to the excitation member and applies active pressure fluctuation to the excitation fluid chamber, while being supported by the second mounting member.

* * * * *